US008473984B1

(12) United States Patent
Harmon et al.

(10) Patent No.: US 8,473,984 B1
(45) Date of Patent: Jun. 25, 2013

(54) DYNAMICALLY SWITCHING BETWEEN UNICAST AND BROADCAS ON A MOBILE COMMUNICATIONS NETWORK

(75) Inventors: Jay S. Harmon, Leawood, KS (US); Randy S. Ulvenes, Olathe, KS (US); Jeff Klaumann, Prairie Village, KS (US); Jeff B. Danley, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 518 days.

(21) Appl. No.: 12/207,176

(22) Filed: Sep. 9, 2008

(51) Int. Cl.
*H04N 7/10* (2006.01)
*H04N 7/025* (2006.01)
*H04N 5/445* (2006.01)
*H04N 7/16* (2006.01)
*G06F 3/00* (2006.01)
*G06F 13/00* (2006.01)
*H04B 7/00* (2006.01)

(52) U.S. Cl.
USPC ........... 725/46; 725/32; 725/34; 725/37; 725/38; 725/60; 725/61; 725/135; 370/310

(58) Field of Classification Search
USPC .......................................................... 725/110
See application file for complete search history.

(56) References Cited

U.S. PATENT DOCUMENTS

| | | | |
|---|---|---|---|
| 6,405,372 B1 * | 6/2002 | Kim et al. ........................ 725/50 |
| 6,941,574 B1 * | 9/2005 | Broadwin et al. ............... 725/37 |
| 7,571,232 B2 * | 8/2009 | Zigmond et al. ............... 709/227 |
| 8,045,557 B1 * | 10/2011 | Sun et al. ....................... 370/390 |
| 2005/0028219 A1 * | 2/2005 | Atzmon et al. ................. 725/116 |
| 2005/0216941 A1 * | 9/2005 | Flanagan et al. ................. 725/88 |
| 2006/0099933 A1 * | 5/2006 | Benveniste ................. 455/412.1 |
| 2006/0259937 A1 * | 11/2006 | Fries .............................. 725/116 |
| 2007/0168523 A1 | 7/2007 | Jiang et al. |
| 2007/0219987 A1 * | 9/2007 | Mueller et al. .................... 707/5 |
| 2008/0069071 A1 * | 3/2008 | Tang ............................. 370/342 |
| 2008/0291849 A1 * | 11/2008 | Ostermeier et al. ........... 370/270 |
| 2009/0013363 A1 * | 1/2009 | Lee et al. ....................... 725/110 |

OTHER PUBLICATIONS

Bakhuizen, et al. Mobile Broadcast/Multicast in Mobile Networks Aug. 2004.
Santos, et al. Multicast/Broadcast Network Convergence in Next Generation Mobile Networks 2004 Instituto de Telecomunicacoes, University of Aveiro, Aveiro, Portugal http://www.itu.int/ITU-T/ngn/fgngn/.
TeliaSonera MediaLab Mobile Broadcast/Multicast Service (MBMS) White Paper Aug. 2004 www.medialab.sonera.fi.

* cited by examiner

*Primary Examiner* — Justin Shepard

(57) ABSTRACT

A method, system, and medium are provided for dynamically switching between unicast and broadcast carriers for delivering content in a mobile network. A first listing of channels is provided to a client mobile device, wherein a first unicast content stream is associated with a first channel. A determination is made to provide an event through a broadcast carrier over the first channel. The first content stream is disassociated with the first channel, and the broadcast event is associated with the first channel. A broadcast alert is communicated to the client mobile device to indicate the change. A second listing of channels is provided to the client mobile device.

16 Claims, 12 Drawing Sheets

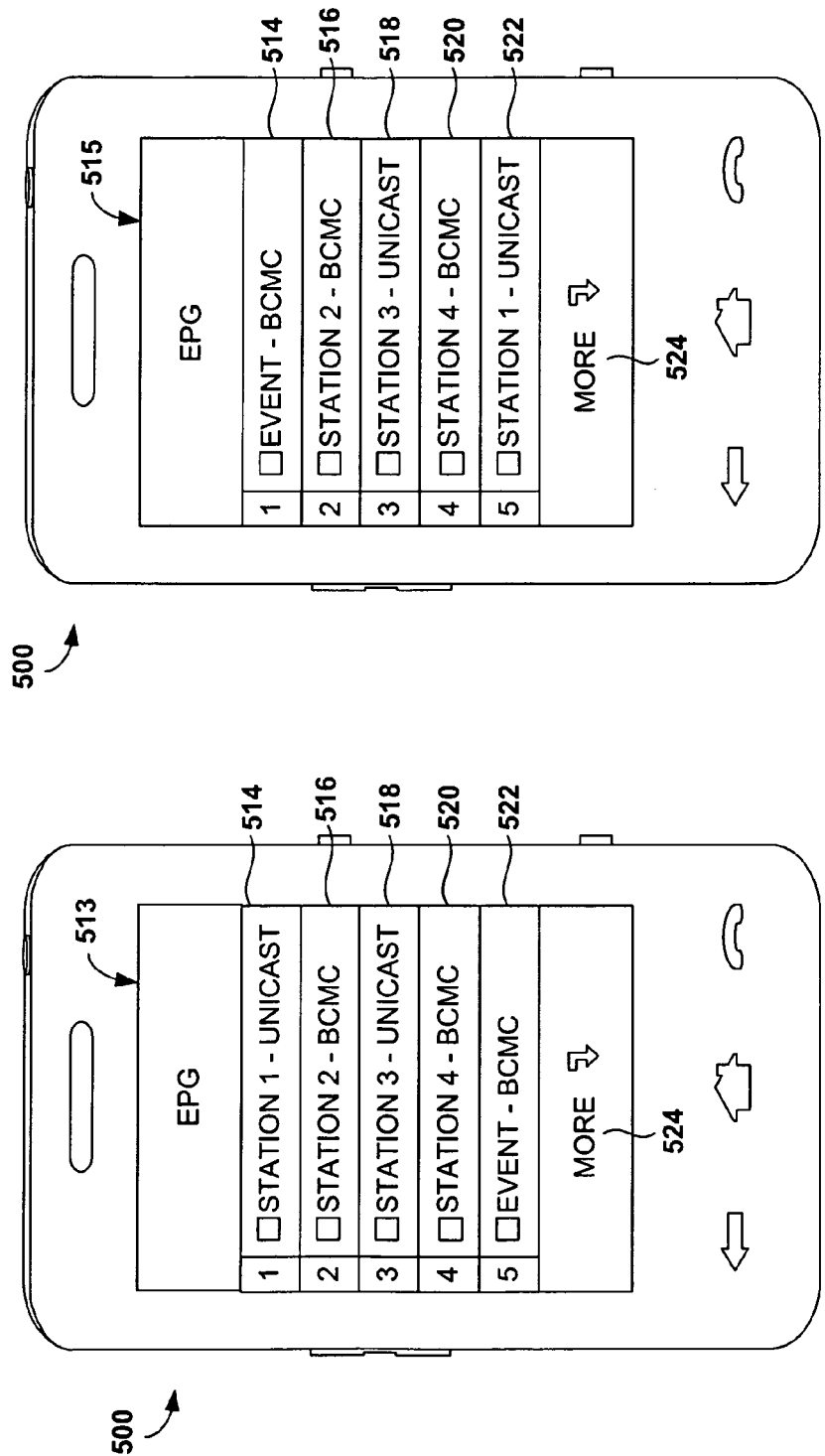

DYNAMICALLY SWITCHING BETWEEN UNICAST AND BROADCAS ON A MOBILE COMMUNICATIONS NETWORK

SUMMARY

Embodiments of the invention are defined by the claims below, not this summary. A high-level overview of embodiments of the invention are provided here for that reason, to provide an overview of the disclosure.

In a first aspect, a set of computer-executable instructions provides an exemplary method for dynamically switching between unicast and broadcast delivery of content to a mobile communications device client. In an embodiment, the exemplary method includes providing a first content stream to the client using a unicast carrier. A broadcast alert is communicated to the client. The broadcast alert includes an indication that a second content stream will be available to the client. In response to receiving a request from the client for the second content stream, the first content stream is stopped and the second content stream is provided to the client using a broadcast carrier.

In a second aspect, a set of computer-executable instructions provides another exemplary method for dynamically switching between unicast and broadcast delivery of content to a mobile communications device client. In an embodiment, the exemplary method includes displaying a first listing of channels having a first channel that is associated with a first content stream. In a further illustrative step, the embodiment includes receiving a broadcast alert that indicates that a second content stream will be available. According to a final illustrative step of the exemplary method, a second listing of channels is received and the second listing of channels includes a representation of the second content stream.

In another aspect, a set of computer-executable instructions provides an exemplary method of dynamically enabling broadcast delivery of content to a plurality of mobile communications device clients. According to an embodiment of the present invention, the exemplary method includes providing a first displayable listing of channels to the plurality of clients. The first listing of channels includes a first channel that is associated with a first content stream. According to a second illustrative step, a determination is made that at least one of the plurality of clients is displaying the first content stream, which is provided to the client using a unicast carrier. A broadcast alert is communicated to the at least one client, where the broadcast alert includes a selectable option for receiving a second content stream. In response to receiving a user selection of the option, the first content stream is discontinued and disassociated with the first channel. The second content stream is associated with the first channel and is provided to the at least one client using a broadcast carrier.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIGS. 5-8 depict examples of EPGs displayed on a mobile device in accordance with embodiments of the present invention;

DETAILED DESCRIPTION

Figure 1:
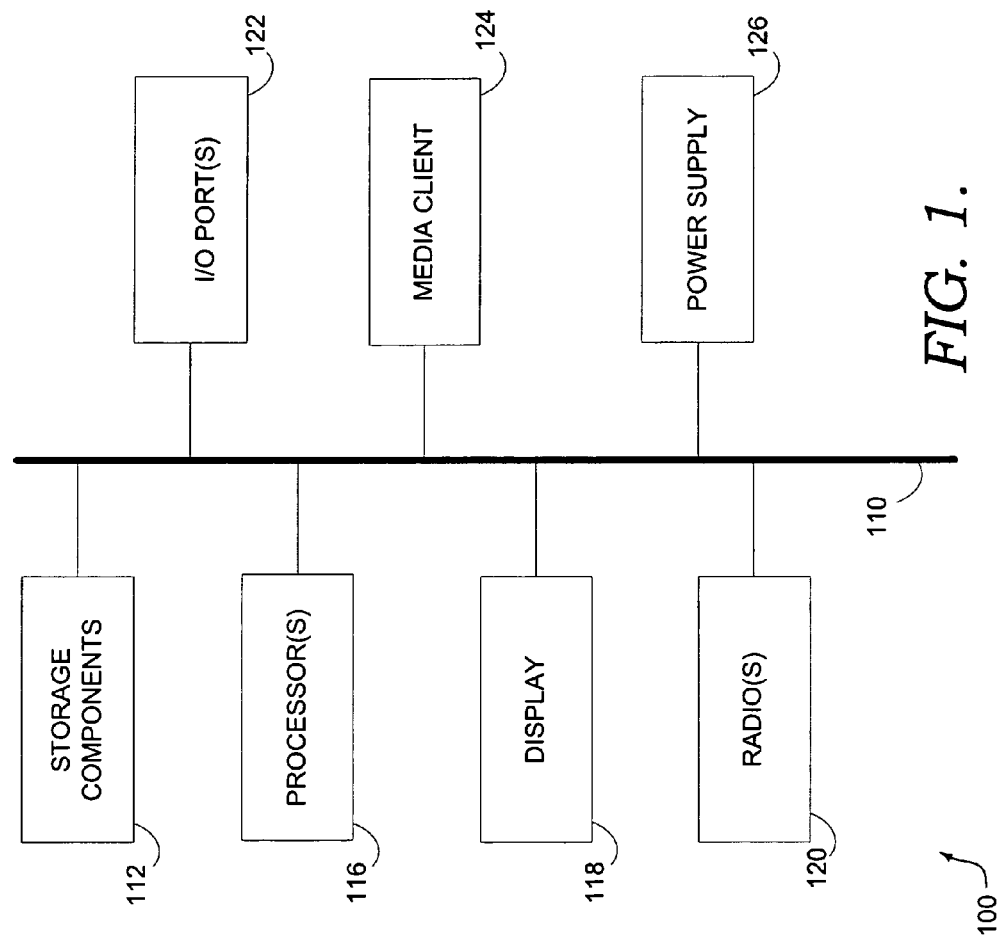
FIG. 1 is a block diagram showing an exemplary mobile communications device in accordance with an embodiment of the present invention.

Embodiments of the present invention provide systems and methods for dynamically switching between unicast and broadcast delivery of content to a mobile communications device. By dynamically updating electronic programming guides that include pointers to content streams and providing alerts notifying users of available broadcast content, embodiments of the present invention facilitate selectively delivering broadcast content to a media client on a mobile communications device without significantly disrupting the user's experience.

Throughout the description of the present invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

BCMCS Broadcast and Multicast Service
BSC Base Station Controller
BTS Base Transceiver Station
CDMA Code Division Multiple Access
EDGE Enhanced Data Rates for GSM Evolution
EPG Electronic Programming Guide
EV-DO Evolution-Data Optimized
GPRS General Packet Radio Service
GSM Global System for Mobile Communications
IP Internet Protocol
MBMS Multimedia Broadcast Multicast Service
MNO Mobile Network Operator
MSC Mobile Switching Center
PID Packet Identification Descriptor
PSTN Public Switched Telephone Network
RTP Real-Time Transport Protocol
RTSP Real Time Streaming Protocol
UMTS Universal Mobile Telecommunications System
URL Uniform Resource Locator
VOD Video-on-Demand
Wi-Max Worldwide Interoperability for Microwave Access
XML Extensible Markup Language The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, and the like. The invention may also be practiced in distributed computing environments where tasks are performed by remote-processing devices that are linked through a communications network.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

FIG. 1 depicts an illustrative block diagram of a mobile communications device that is suitable for operation of an embodiment of the present invention. Throughout this disclosure, reference will be made to a mobile communications device, such as in FIG. 1 and beyond. FIG. 1 depicts a selection of components that will generally be included in the mobile communications device to help facilitate various functional aspects of embodiments of the invention. As shown, a bus 110 couples, directly or indirectly, the following illustrative components: a storage component 112, a processor 116, a display 118, a radio 120, input/output ports 122, a media client 124 and a power supply 126.

Storage components 112 may take the form of the aforementioned computer readable media. As with all of the illustrative components of FIG. 1, although we refer to them sometimes in the singular, that should not be read so as to imply that we mean only a single of each of the components is contemplated within the scope of our invention. To the contrary, by way of example, storage component or components 112 may actually be composed of constituent storage components located within mobile device 100.

Processors 116 facilitate a flow of information among all or a portion of the components shown in FIG. 1 as well as computer usable instructions that help facilitate various aspects of the present invention. For example, in one embodiment, an operating system of mobile device 100 also helps coordinate various functional aspects of the present invention. Processors 116 operate in connection with running such an operating system.

Radios 120 facilitate the communication of wireless communication signals to and from mobile device 100. Illustrative protocols that can be utilized in connection with an embodiment of the present invention include CDMA, EDGE, EV-DO, GPRS, GSM, UMTS, Wi-Fi, WiMAX, and the like. The radios 120 facilitate wireless communications between the device and a national or even global telecommunications network.

Input/output ports 122 provide a way for mobile device 100 to interact with other peripheral components. Illustrative input/output ports include a ear-piece or headphone jack, a USB port, an infrared port, and the like. Different input/output ports 122 could be provided as is needed to facilitate communication of other peripheral components. Display 118 enables a user to view content. In an embodiment, display 118 can be a touchscreen display that receives user input as well. In another embodiment, display 118 is display screen for displaying content such as, for example, an LCD screen.

Media client 124 includes software and/or hardware modules and components necessary for receiving and rendering content from a mobile network. Media client 124 can be configured to retrieve and render many types of content such as television programming, videos from video-on-demand (VOD) services, downloadable movies, music, radio programs, and the like. Media client 124 is also capable of rendering a listing of virtual channels referred to herein as an electronic programming guide (EPG). Media client 124 can reference pointers associated with virtual channels to retrieve content from specified locations.

Power supply 126 may also take on a variety of forms ranging from a battery to a charging mechanism to other forms of power sources that serve to provide power to mobile device 100.

The selected components of mobile device 100 are meant to be illustrative in nature, and the various lower-level details of the components are not elaborated on so as to not obscure the present invention. Clearly, some of the components may be absent in some embodiments of the present invention, and additional components not shown may also be part of mobile device 100. Attempting to show all of the various components of mobile device 100 would obscure certain novel aspects, and we will refrain from such elaboration at least for the sake of brevity.

Figure 2:
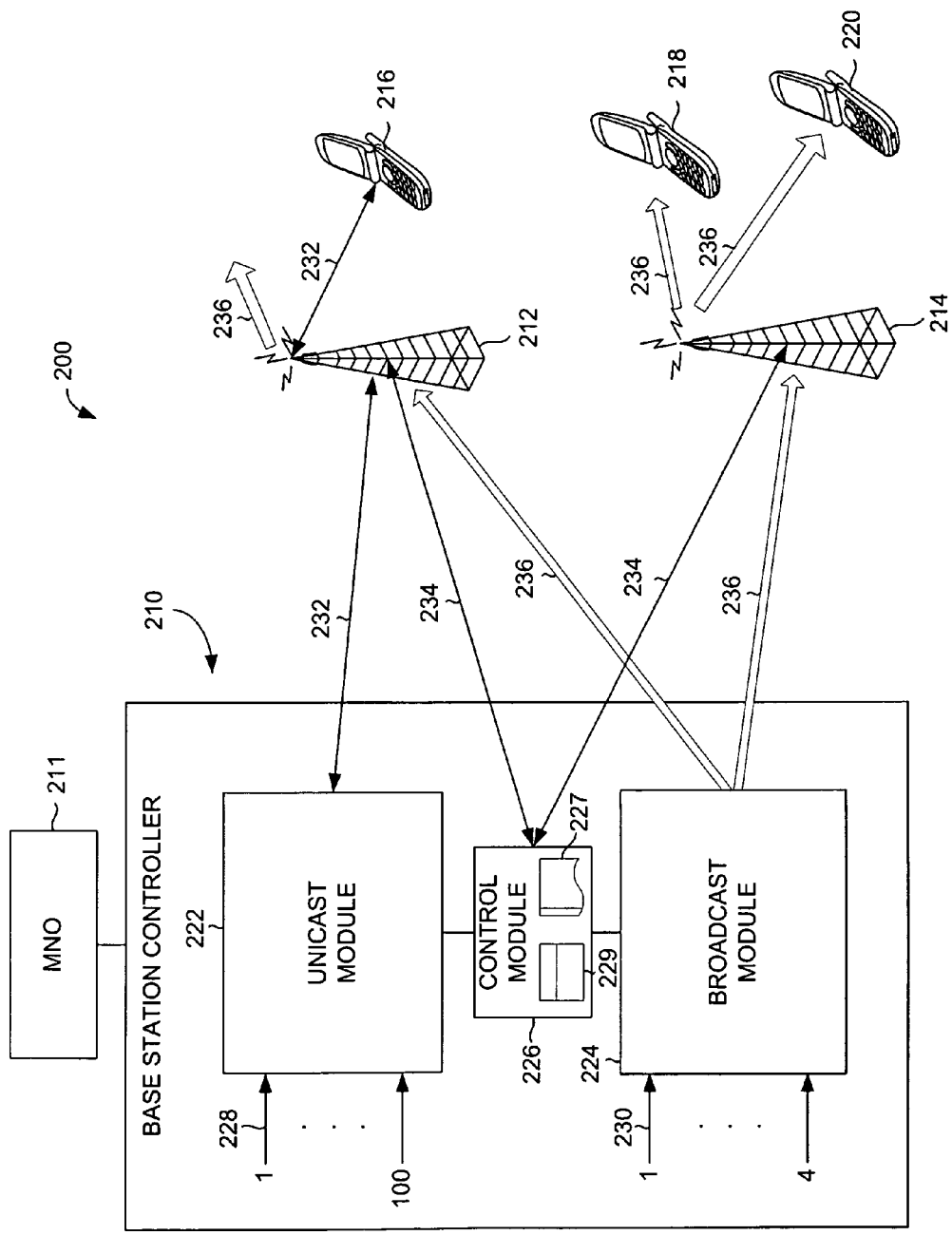
FIG. 2 is a block diagram showing an exemplary network environment suitable for implementing an embodiment of the present invention.

Turning now to FIG. 2, a block diagram is shown that illustrates an exemplary network environment 200 in accordance with an embodiment of the present invention. Network environment 200 represents an illustrative portion of a mobile network and includes a mobile network operator (MNO) 211, a base station controller (BSC) 210, base stations 212 and 214, and mobile communications devices 216, 218 and 220. Network environment 200 is merely an example of one suitable network environment and is not intended to suggest any limitation as to the scope of use or functionality of the present invention. Neither should network environment 200 be interpreted as having any dependency or requirement related to any single component or combination of components illustrated therein.

It will be understood by those skilled in the art that each of these elements of the network environment 200 is also scalable. That is, for example, network environment 200 can include a large number of mobile devices 216, 218, and 220, base stations 212 and 214, or BSCs 210. Of course, the same is true with any of the other elements of the exemplary network environment 200, including elements which have been omitted from the illustration of FIG. 2 for the purposes of clarity and brevity.

As is known in the art, in a wireless network (such as network environment portion 200), mobile devices 216, 218, and 220 send and receive radio signals through base stations 212 and 214. Base stations 212 and 214 can include, for example, cell towers and base transceiver systems (BTSs). Typically, a number of base stations 212 and 214 are connected to a BSC 210. In an embodiment, each of base stations 212 and 214 can have a BSC integrated therein. The BSC 210 manages communications between a number of base stations 212 and 214 and a number of mobile devices compatible with the wireless network. The BSC 210 connects to a mobile switching center (MSC) (not shown) that acts as a telephone exchange to handle mobile device activity through associated BSCs 210 while connecting as needed to the public switched telephone network (PSTN) (not shown).

Mobile devices 216, 218, and 220 can include any number of various types of mobile communications devices such as mobile communications device 100, described above with reference to FIG. 1. According to embodiments of the present invention, mobile devices 216, 218, and 220 can be mobile phones, smart phones, computing devices, personal digital assistants (PDAs) or any combination of these or other devices. Mobile devices 216, 218, and 220 have the ability to present multimedia content such as, for example, TV shows, movies, videos, MP3 files, and radio programs. This list is not exhaustive. Media may be presented as it is received from a wireless network or from memory within the mobile device 216, 218, or 220. Mobile devices 216, 218, and 220 can also be capable of receiving numerous forms of communication. Examples of communications that can be received include phone calls, video calls, text messages, multimedia messages, emails, calendar updates, and task reminders.

As illustrated in FIG. 2, BSC 210 includes, among other components not shown, a unicast module 222, a broadcast module 224, and a control module 226. In another embodiment, any one or more of these components may be separate from BSC 210 and can be contained within a base station 212 or 214, an MSC (not shown), or some other element of the wireless network. In one embodiment, each of the components 222, 224, and 226 can be independently maintained in the network environment 200.

Unicast module 222 facilitates communication between other aspects of the wireless network of which network environment 200 is a portion and mobile device 216 via a unicast communication connection 232. According to an embodiment, unicast module 222 participates in providing a number of unicast channels 228 to mobile device 216 via any number of unicast carriers. Unicast channels 228 can include multimedia channels, data channels, and the like. For example, in an embodiment, unicast channels 228 carry signals from TV stations. In another embodiments unicast channels 228 carry signals from VOD services. In other embodiments, any number of the unicast channels 228 can carry combinations of these or other types of media.

BSC 210 further includes a broadcast module 224, which facilitates broadcasting communications to any number of base stations 212 and 214, and ultimately to a number of mobile devices 216, 218, and 220. In an embodiment, broadcast module 224 broadcasts content via any number of broadcast channels 230 over broadcast carriers. Broadcast module 224 can utilize various standards and protocols such as broadcast and multicast service (BCMCS), multicast broadcast multimedia service (MBMS), and the like. In one embodiment, the communications 236 illustrated in FIG. 2 occur using Real Time Protocol (RTP), which is used to send multimedia content to mobile devices 216, 218, and 220. Additionally, Real Time Streaming Protocol (RTSP) can be used to send control communications between a media presentation device (e.g. mobile device 216, 218, or 220) and a content provider such as BSC 210 or some other network element not illustrated. In other embodiments, other communication protocols or transport protocols may be used.

With continued reference to FIG. 2, BSC 210 includes a control module 226 that manages communications over unicast and broadcast carriers associated with unicast module 222 and broadcast module 224, respectively. Control module 226 is capable of determining which, if any, of the unicast channels 228 should be provided by unicast module 222 and which, if any, of the broadcast channels 230 should be provided by broadcast module 224. According to embodiments of the invention, control module 226 can communicate with base stations 212 and 214 to receive information such as for example, information regarding the number of clients and associated data or bandwidth consumption associated therewith.

In some embodiments, control module 226 can communicate with mobile devices 216, 218, and 220 as well. When control module 226 determines that a channel should be switched from utilizing a unicast carrier to a broadcast carrier, control module 226 directs mobile devices 216, 218, and 220 to make the switch. In an embodiment, control module 226 can provide this direction in the form of an updated electronic programming guide (EPG) that includes a pointer to the broadcast carrier associated with the particular channel that is being switched. In this manner, mobile devices 216, 218, and 220 affect the switch by redirecting from a unicast carrier to a broadcast carrier.

Control module 226 includes logic 227 designed to appropriately determine when a broadcast channel should be enabled. In some cases, broadcast channels can be enabled to carry content that is being provided via a number of unicast channels 228. For example, according to an embodiment, control module 226 can switch the delivery of a content stream from unicast carriers via unicast module 222 to broadcast carriers via broadcast module 224 in response to determining that the quality of the content would be improved thereby. In an embodiment, logic 227 includes rules and/or heuristics that make such a determination based on any number of various factors such as, for instance, the number of mobile devices 216, 218 or 220 consuming bandwidth from a base station 212 or 214, the quality of the communications being delivered to unicast module 222, or the like. In another embodiment, control module 226 receives instructions for switching between unicast and broadcast communications from MNO 211.

Control module 226 also includes an electronic programming guide (EPG) server 229. EPG server 229 generates EPGs that includes virtual channels that represent various channels such as unicast channels 228 and broadcast channels 230. An EPG is a listing of virtual channels, with each virtual channel corresponding to a network channel. EPGs can take any number of various forms. In one embodiment, EPGs are generated as XML documents and sent to mobile devices 216, 218, and 220. Mobile devices 216, 218, and 220 display listings of virtual channels based on the XML document.

Virtual channels typically include pointers to actual locations of content such that selection of a virtual channel can result in display of the content that is provided over an associated channel. Content can be located using addressing schema associated with a content provider. Content providers can include content servers located in the mobile network, proxy servers in the mobile network that facilitate providing content from providers outside the mobile network, content servers outside of the mobile network, and the like. The pointers can include such addressing schema as uniform resource locators (URLs), packet identification descriptors (PIDs), internet protocol (IP) addresses, and the like. EPG server 229 is capable of receiving information from other processes within control module 226 such as logic 227, and in response to a decision to change a carrier associated with a virtual channel, EPG server 229 can generate updated EPGs and provide the updated EPGs over the air to mobile devices 216, 218, and 220. For example, an updated EPG can include a listing of virtual channels where one of the virtual channels has been assigned a pointer (e.g., IP address) that is different than the pointer that was previously assigned to the channel. In this manner, an updated EPG is sent to mobile devices 216, 218, and 220 and replaces an EPG stored on a mobile device 216, 218, and 220.

In some embodiments, EPG server 229 may actually be maintained at some other node of a mobile network such as, for example, at the MNO 211. Where EPG server 229 is located at BSC 210, each BSC 210 in a network can have an EPG server such that only those nodes of the network associated with switches between unicast and broadcast content delivery methods will update EPGs. In another embodiment, MNO 211 can include a unicast module, a broadcast module, and a control module such that content delivery can be switched between unicast and broadcast methods for more than one BSC at a time, including for the whole network.

Figure 3:
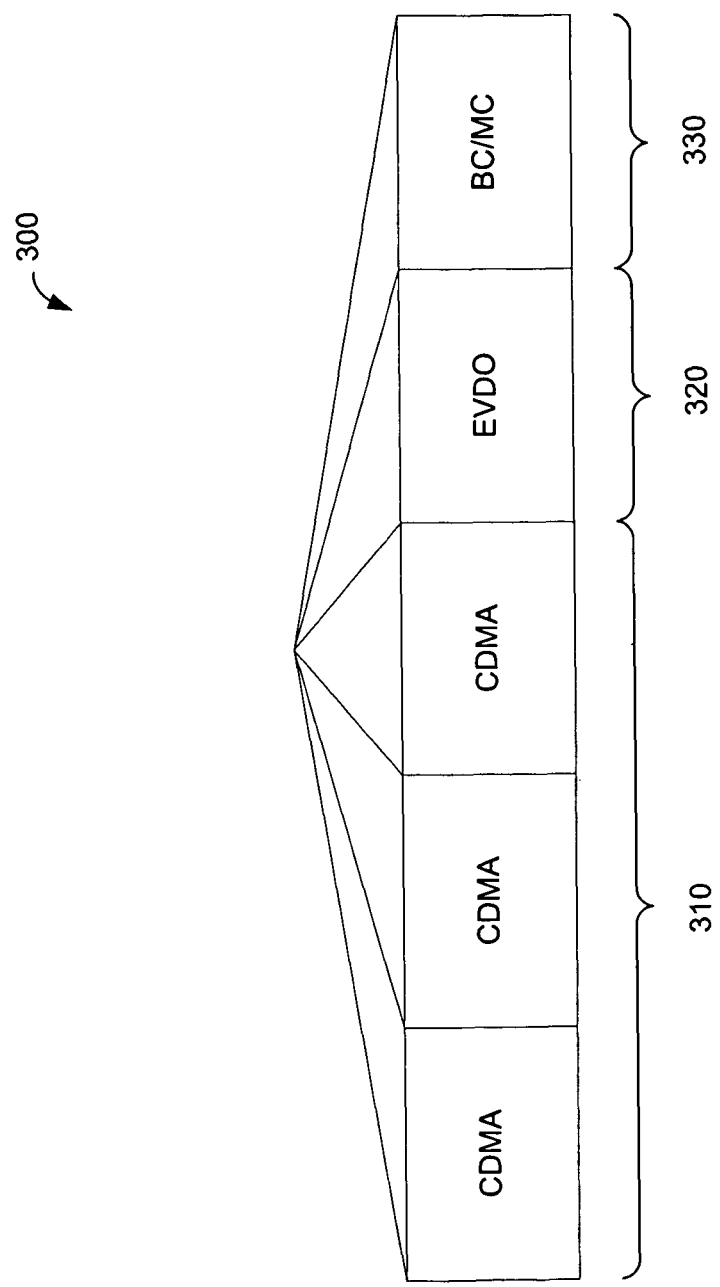
FIG. 3 is a block diagram illustrating an exemplary bandwidth spectrum in accordance with an embodiment of the present invention.

Turning now to FIG. 3, a block diagram shows illustrative divisions of a radio spectrum 300 associated with a mobile network in accordance with embodiments of the present invention. The divisions illustrated in FIG. 3 are illustrative and are not meant to limit the configuration of a mobile network's bandwidth spectrum to the particular embodiment depicted. Particular implementations of the present invention may require varying spectral divisions, as the configuration may depend upon total bandwidth available, business decisions, regulatory issues, and the like.

As shown in FIG. 3, a mobile network's radio spectrum 300 can include several carriers 310 for voice telecommunications. In the example depicted, voice communications are carried using CDMA protocols, but other protocols and standards are possible. The spectrum 300 also includes a carrier 320 for unicast data communications, which in the illustrated embodiment are carried using EV-DO. As with voice communications, different protocols and standards could be used to carry unicast data communications. A fifth carrier 330 is also illustrated, and is used to carry broadcast or multicast content (BC/MC). Carrier 330 can use such standards and protocols as MBMS, BCMCS, RTP, and the like. A client device can be instructed to listen for communications from any of these carriers, and can dynamically switch between carriers. In an embodiment, each of the carriers 310, 320 and 330 can include an equal amount of bandwidth. In other embodiments, the bandwidth can be distributed in other ways to optimize efficiency and quality of service. For example, in one embodiment, each of CDMA carriers 310 can include 2.5 MHz of bandwidth, the EV-DO carrier can include 1.25 MHz, and the BC/MC carrier can include 1.25 MHz. Other configurations and spectral divisions can be implemented in the context of embodiments of the present invention.

Figure 4:
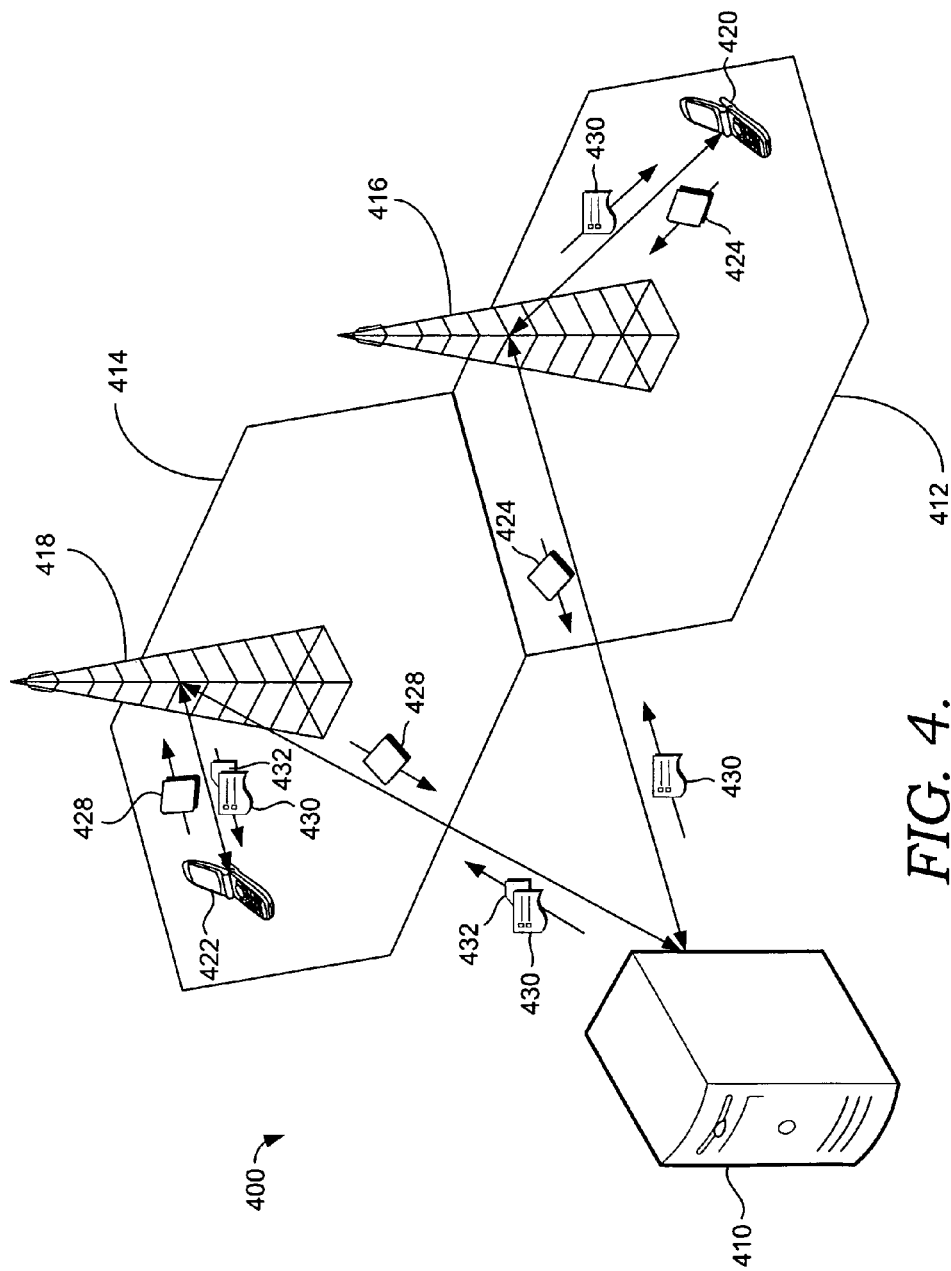
FIG. 4 is a schematic diagram showing an exemplary implementation of an electric programming guide (EPG) server according to an embodiment of the present invention.

Turning to FIG. 4, a schematic diagram is shown that illustrates an exemplary network implementation 400 of an EPG server 410 in accordance with embodiments of the present invention. EPG server 410 can be implemented at a BSC, an MNO, or some other mobile network component. The embodiment illustrated in FIG. 4 will be assumed to be implemented at a BSC such as BSC 210 in FIG. 2. As illustrated in FIG. 4, EPG server 410 manages EPGs for a number of different cells in a cellular (e.g., mobile) network. It will be understood by those of ordinary skill in the art that a BSC can manage communications for a number of different cells, sometimes anywhere between 10 and 100 cells or more. In an embodiment, EPG server 410 manages EPGs and EPG updating for each of the cells managed by the BSC with which the EPG is associated. In another embodiment, a BSC can include a number of EPG servers 410, each EPG server 410 managing EPGs and EPG updating for a subset of the total number of cells managed by the BSC with which the EPG server 410 is associated.

Moreover, FIG. 4 includes only one mobile device 420 associated with a cell 412 and one mobile device 422 associated with a cell 414. This configuration is depicted for purposes of clarity and brevity, and is not intended to suggest that a cell can have only a single mobile device associated therewith, or that EPG server can only perform a discrete number of tasks as depicted herein. In some embodiments, a large number of mobile devices 420 and 422 can be associated with any one cell at a given time, and the number can fluctuate as mobile devices 420 and 422 move in and out of various cells in the network. EPG 410 is configured to handle these types of changes and situations dynamically and in response to changes in the network.

As illustrated in FIG. 4, EPG server 410 communicates with mobile devices 420 and 422 via cell towers (which can include base stations and other equipment) 416 and 418, respectively. EPG server 410 receives indications (e.g., data) 424 and 428 regarding how the mobile devices 420 and 422 are being used. That is, EPG server 410 receives an indication 424 that the media client of mobile device 420 is currently not active (i.e., a user of mobile device 420 has not opened a media application). EPG server 410 receives an indication 428 that the media client associated with mobile device 422 is active. Indication 428 can further indicate whether a user is viewing content using the media client or whether the user is perusing an EPG stored on the mobile device 422 and associated with the corresponding media client.

In response to receiving an indication (not shown) that a unicast channel has been, is being, or will be switched to a broadcast carrier (or vice versa), EPG server 410 creates an updated EPG 430 that includes the appropriate pointers and virtual channels. As discussed above with reference to FIG. 2, EPG 430 can include, for example, an XML file listing virtual channel identifiers and pointers. EPG server 410 communicates the updated EPG 430 to each of the mobile device clients 420 and 422. When EPG server 410 communicates the updated EPG 430 to mobile device 422, EPG server 410 includes a broadcast alert 432, or switch message. The broadcast alert 432 can be displayed by the media client associated with mobile device 422 as a visual indication to a user that the switch is going to be made.

In an embodiment, the type of broadcast alert 432 sent and/or displayed can vary depending on whether a user associated with mobile device 422 is viewing content or perusing the existing EPG. If the user is perusing the EPG, broadcast alert 432 can use text, images, sound, graphics, or some other tangible indication to inform the user that the assignment to a pointer of one or more of the channels in the EPG is going to change. In an embodiment, broadcast alert 432 can include an indication of the channels that will be involved in the switch. Additionally, broadcast alert 432 can include an indication of the time that the switch in channel assignment will occur.

If the user is viewing content such as, for example, a video or TV program, broadcast alert 432 can include an indication that the switch will be made. In an embodiment, broadcast alert 432 can include the time that the switch will be made. In one embodiment, because the user is viewing content, broadcast alert 432 can include a selectable option for receiving the broadcast content (i.e., for manually instructing the media client on the user's mobile device 422 to redirect to a specified broadcast carrier and channel such that the content can be received. The selectable option can take the form as a button, a link, a clickable region, or the like.

If the media client associated with a mobile device 420 is not active—that is, the associated user of mobile device 420 is not viewing content or perusing the EPG—EPG server 410 does not communicate a broadcast alert to mobile device 420. In another embodiment, EPG server 410 does communicate broadcast alert 430 to mobile device 430, but the media client associated with mobile device 410 recognizes that broadcast alert 430 should be ignored and does not display it.

Turning now to FIGS. 5-8, a series of depictions of an illustrative EPG 510 displayed on a mobile communications device 500 is shown. EPG 510 includes a header field 512 that can display various types of information including, for example, text that identifies EPG 510, advertisements, or other information. EPG 510 also includes a number of virtual channels 514, 516, 518, 520, and 522 and a selection box 524 that can be used to display additional virtual channels. A virtual channel 514 includes a virtual channel identifier 526, which is a numeral unique to the virtual channel 514. Other types of identifiers can be used to distinguish each virtual channel 514, 516, 518, 520, and 522 from the others.

Virtual channel 514 also includes text 530 that identifies the source of content associated with virtual channel 514 and an icon 528 (or other image) that can assist a user in identifying the source of content of the virtual channel. In an embodiment, text 530 can include a name of a particular instance of content such as, for example, the name of a video, movie, TV program, or the like. In an embodiment, only icon 528 identifies the source of the content and in some embodiments, icon 528 may also include text such as when icon 528 is a trademark or other identifying image associated with a content source such as a TV station. Moreover, although the illustrative virtual channels 514, 516, 518, 520, and 522 depicted in FIGS. 5-8 each include a designation of "UNICAST," "BCMC," or "BLANK," it should be understood that these designations typically are not displayed, but are included in the illustrations for the purposes of facilitating a clear understanding of the operation of embodiments of the present invention.

Figure 5:
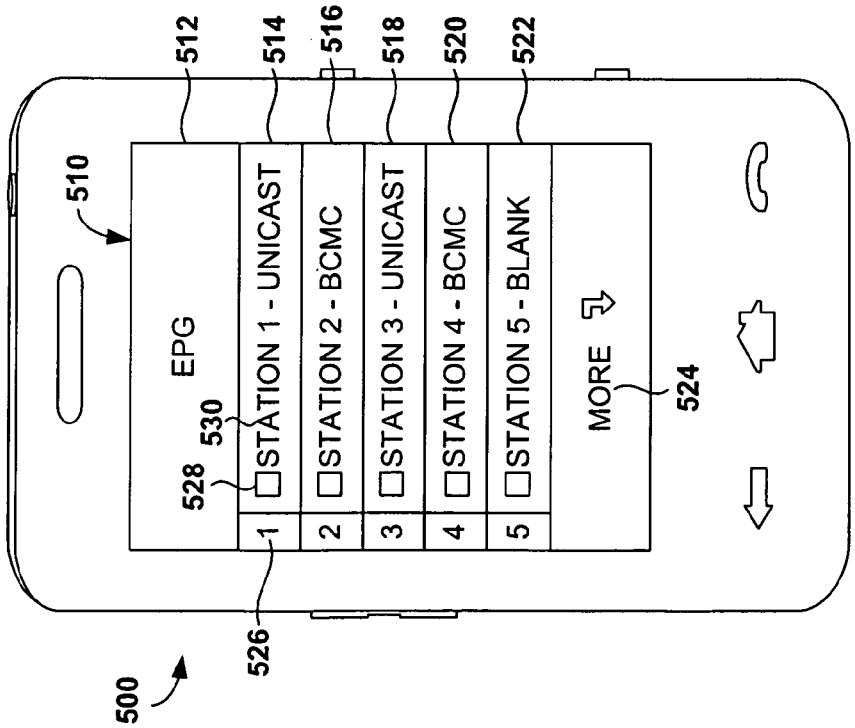

As shown in the example depicted in FIG. 5, virtual station 514, identified as Station 1, is associated with a unicast carrier, Station 2 is associated with a broadcast (or multicast) carrier, Station 3 is associated with a unicast carrier, Station 4 is associated with a broadcast carrier, and Station 5 is not associated with a carrier (i.e., it is left "blank"). Of course, any number of permutations of this configuration are possible, including a configuration in which all of the virtual channels 514, 516, 518, 520, and 522 are associated with a unicast carrier or carriers or a broadcast carrier or carriers.

Figure 6:
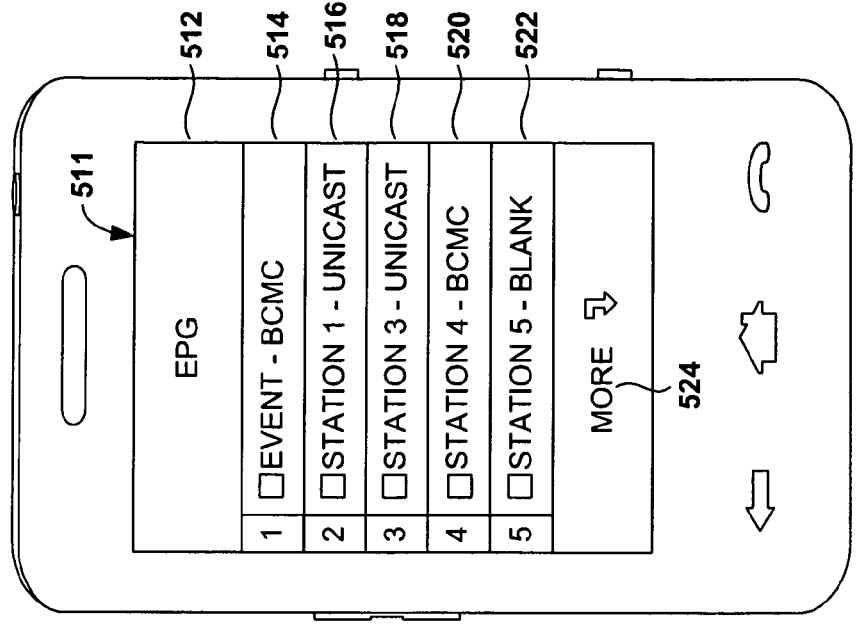

Turning to FIG. 6, an updated EPG 511 has been provided to mobile device 500 in response to a network decision to provide an event using a broadcast carrier that will be dynamically associated with the first virtual channel 514. A network decision, as used herein, can include a decision made for the network as a whole, a decision made with respect to a particular network, or the like, and can be made at an MNO, a BSC, or some other network element. An event can include any number of types of content. In an embodiment, the event is a content stream that corresponds to a televised sporting event. In another embodiment, the event is a content stream that corresponds to a popular television program. In other embodiments, the event can include other types of content streams such as weather alerts, breaking news stories, mobile account updates, and the like.

As illustrated, virtual channel 1 now includes a pointer to the broadcast carrier through which the event will be provided. Station 1 has been disassociated with the first virtual channel 514 and is now associated with the second virtual channel 516, replacing Station 2 as the associated content provider for the second virtual channel 516. In an embodiment, Station 2 can be associated with a different channel, such as one that is only visible upon selection of the "MORE" button 524. In another embodiment, Station 2 may not be associated with any virtual channel during the event. This decision can be made in situations where Station 2 receives very little attention from users, where Station 2 does not offer any content during the time that the event is playing, or other similar types of decisions.

In an embodiment, the event may be otherwise provided by the content provider designated as Station 2, and the decision to switch the association with that provider from a unicast connection to a broadcast can be based, for example, on a number of mobile devices requesting access to the event, where the number of devices exceeds a threshold that is predetermined such that the quality of content delivery and/or burden on the network can be optimized by switching provision of the content from a unicast to a broadcast carrier.

Turning to FIG. 7, another exemplary EPG 213 configuration is illustrated. EPG 213 is an alternative configuration to the configuration depicted in FIG. 6, and is provided to the mobile device 500 in response to a network determination to provide an event using a broadcast carrier that will be dynamically associated with the fifth virtual channel 522. Because the fifth virtual channel 522 was originally unassociated with a content provider or carrier (i.e., left "blank"), there is no need to displace a content provider associated with one of the other virtual channels 514, 516, 518, or 520 and the only difference between updated EPG 513 and original EPG 510 is that the fifth virtual channel 522 is associatd, in EPG 513, with the event and a broadcast carrier through which the event will be provided.

Referring to FIG. 8, another illustrative depiction of an updated EPG 515 is shown. Updated EPG 515 is provided to the mobile device 500 in response to a network determination to provide an event using a broadcast carrier that will be dynamically associated with the first virtual channel 514. In the example of FIG. 8, a determination has been made to preserve the availability of content streams associated with the content provider designated as "Station 1" during the event. As illustrated, Station 1 has been disassociated with the first virtual channel 514 and has been dynamically associated with the fifth virtual channel 522, which was originally unassociated with a content provider (i.e., left "blank"). It should be readily appreciated by those of ordinary skill in the art that any number of other configurations are possible and that channel associations can be determined in various ways such as to optimize quality of service, network burdens, and the like.

Figure 9:
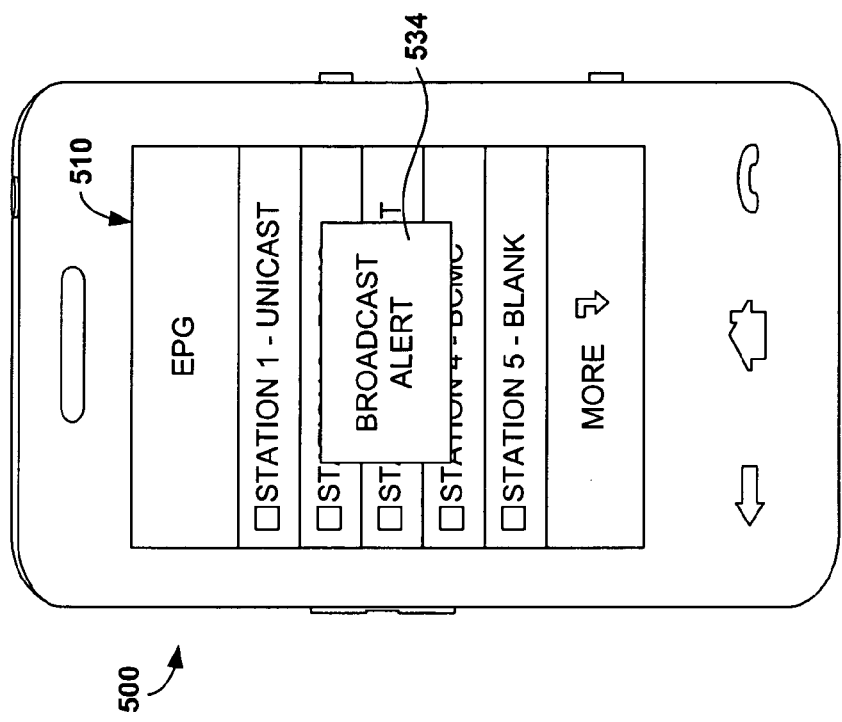
FIGS. 9 and 10 depict examples of broadcast alerts on a display of a mobile communications device in accordance with embodiments of the present invention.

Turning now to FIG. 9, mobile device 500 is shown with an illustrative EPG 510 displayed with a broadcast alert 534 displayed over EPG 510. The shape, size, position, orientation, and nature of broadcast alert 534 is illustrative and can be rendered in any number of various ways, and in some cases can include sounds, animation, or other audio/visual representations. In an embodiment, broadcast alert can be displayed for a predetermined amount of time before it disappears. In another embodiment, broadcast alert can be configured to display until a user performs some action such as pushing a particular key, using a cursor to select broadcast alert 534, and the like. In other embodiments, broadcast alert 534 can include selectable options that a user can select to cause the occurrence of some event or to display a user interface or content stream.

Figure 10:
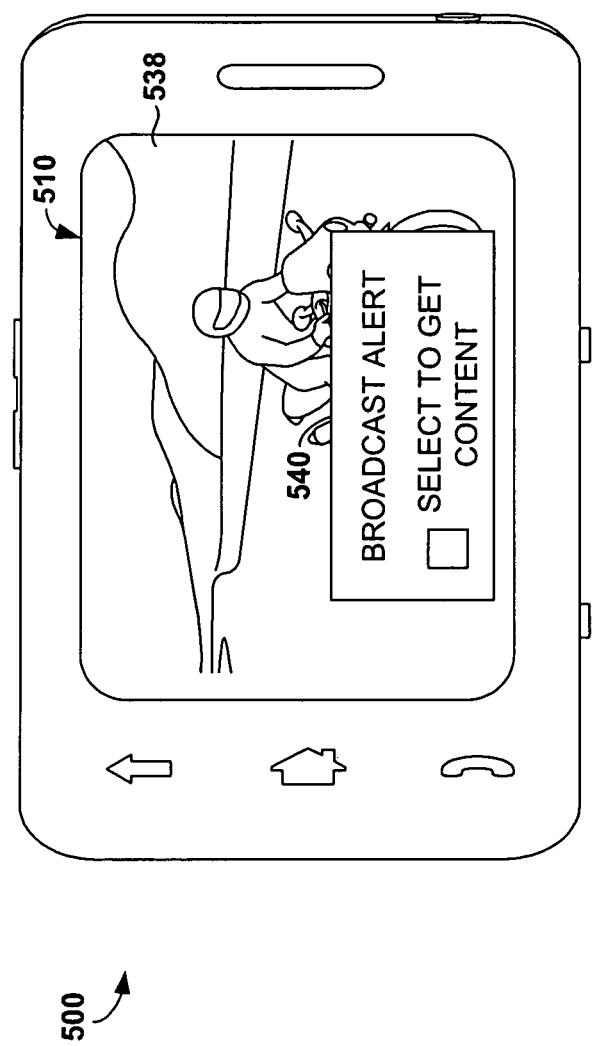

Referring to FIG. 10, another exemplary broadcast alert 540 is depicted. Broadcast alert 540 is displayed on top of some content 538 that is being rendered from a content stream. In an embodiment, content 538 is rendered from a content stream that is provided using a unicast carrier. In response to a network decision to provide an event using a broadcast carrier, broadcast alert 540 is communicated to mobile device 500 and consequently displayed to a user. Broadcast alert 540 includes a selectable option for displaying the event. That is, upon selection of the option by a user, the media client associated with mobile device 500 will search for and retrieve the content stream corresponding to the event. In an embodiment, a user may select a second option for not displaying the event, and may consequently be allowed to continue viewing content 538. In another embodiment, broadcast alert 540 can be displayed for a predetermined amount of time, allowing a user the opportunity to select the option for displaying the event. If the user does not select the option for displaying the event within the predetermined amount of time, broadcast alert 540 will no longer be displayed.

Figure 11:
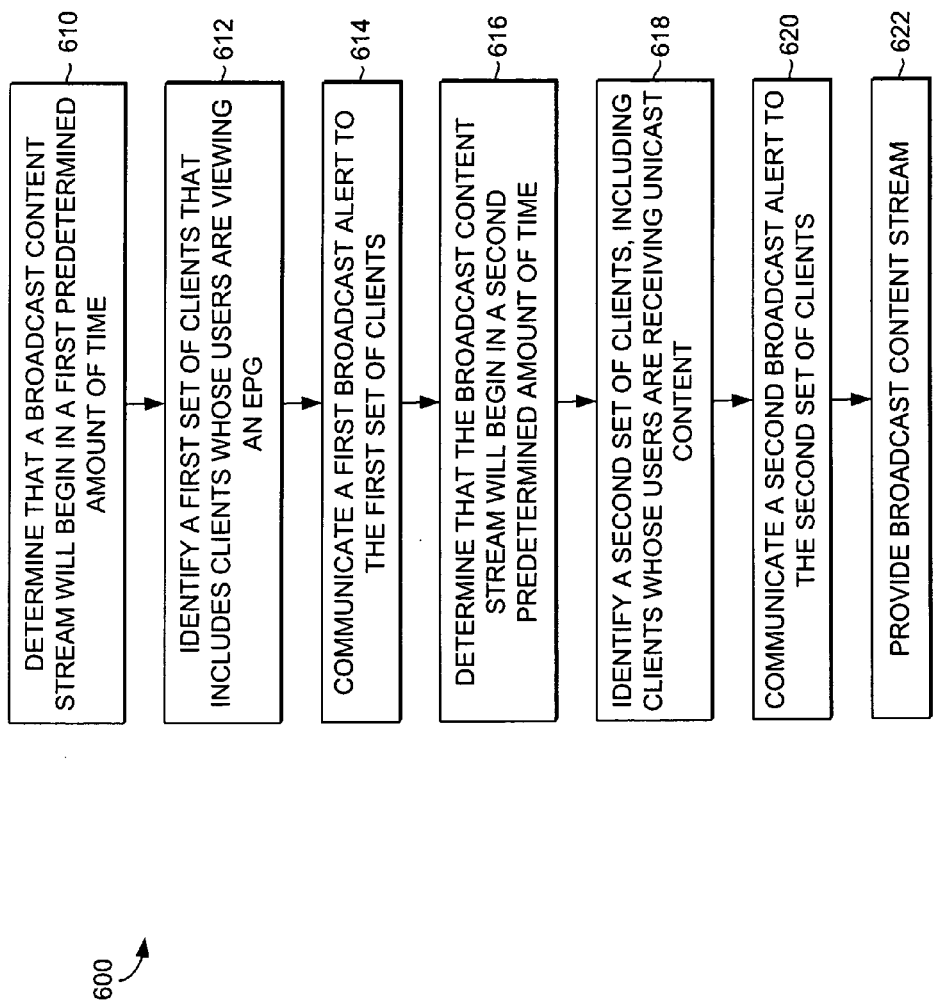
FIGS. 11-14 depict illustrative methods of dynamically switching between unicast and broadcast delivery of content to a mobile communications device client in accordance with embodiments of the present invention.

To recapitulate, we have described systems and methods for dynamically switching between unicast and broadcast delivery of content to a mobile communications device client. Turning to FIG. 11, a flow diagram is provided, showing an illustrative method 600 of dynamically switching between unicast and broadcast delivery of content to a mobile communications device client. At a first illustrative step, step 610, a determination is made that a broadcast content stream will be available in a first predetermined amount of time. For example, in one embodiment, the illustrative method 600 may begin thirty minutes before the start of an event. In step 612, a first set of clients that includes clients whose users are viewing an EPG is identified.

As shown at step 614, a first broadcast alert is communicated to the first set of clients identified in step 612. For example, in one embodiment, the broadcast alert can indicate to a user that an event will be available on a particular virtual channel in thirty minutes. In some embodiments, a selectable option may be included with the broadcast alert such as, for example, an option to set a reminder that causes display of an indication regarding the availability of the event at a predetermined period of time before the event begins. In another embodiment a selectable option can be included such that selection of the option results in the event being displayed automatically when the event becomes available. Other options and content can be included with or displayed instead of the broadcast alert.

With continued reference to FIG. 11, at step 616, a determination is made that the broadcast content stream will be available in a second predetermined amount of time. In an embodiment, the second predetermined time is shorter than the first predetermined amount of time. For example, according to one embodiment, the second predetermined amount of time could be 5 minutes. As shown at step 618, a second set of clients that includes clients whose users are receiving content through a unicast carrier is identified and a second broadcast alert is communicated to the second set of clients, as indicated at step 620. At a final illustrative step 622, the broadcast content stream is provided to the mobile device clients.

Figure 12:
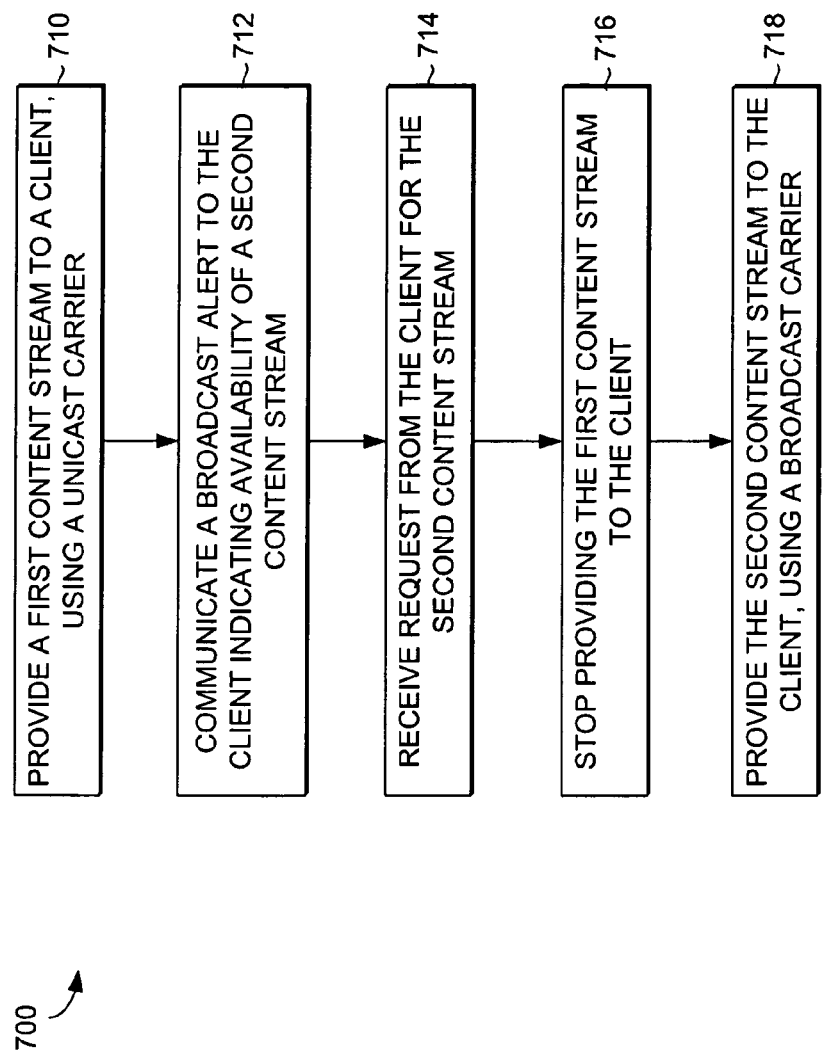

Turning now to FIG. 12, a flow diagram showing another illustrative method 700 of dynamically switching between unicast and broadcast delivery of content to a mobile communications device client is provided. At a first illustrative step, step 710, a first content stream is provided to a client using a unicast carrier. In an embodiment, the first content stream is associated with a first channel, which can in turn be represented by a virtual channel in an EPG. In an embodiment, the first content stream can correspond to any number of various types of media such as, for example, a movie, a TV program, a video clip from a video-on-demand service, or the like. At step 712, a broadcast alert is communicated to the client. The broadcast alert indicates that a second content stream will be available to the client. The broadcast alert can include a visual indication, an audio cue, an animated graphic, an image, or any combination of these or other representations. In an embodiment, the broadcast alert includes a selectable option for receiving the second content stream.

At step 714 a request for the second content stream is sent from the client. In one embodiment, the request is sent as a result of a user selecting a selectable option that was presented to the user with the broadcast alert. In response to the request, the first content stream is discontinued, as shown at step 716, and, at a final illustrative step 718, the second content stream is provided to the client using a broadcast carrier. In an embodiment, the second content stream is associated with the first channel and the first content stream is disassociated with the first channel. In an embodiment, the first content stream can be associated with a second or a third channel and in another embodiment, the second content stream is associated with a second or a third channel. In a further embodiment, the third channel can be an empty channel that is reserved for dynamically associating a content stream therewith during broadcast of an event.

Figure 13:
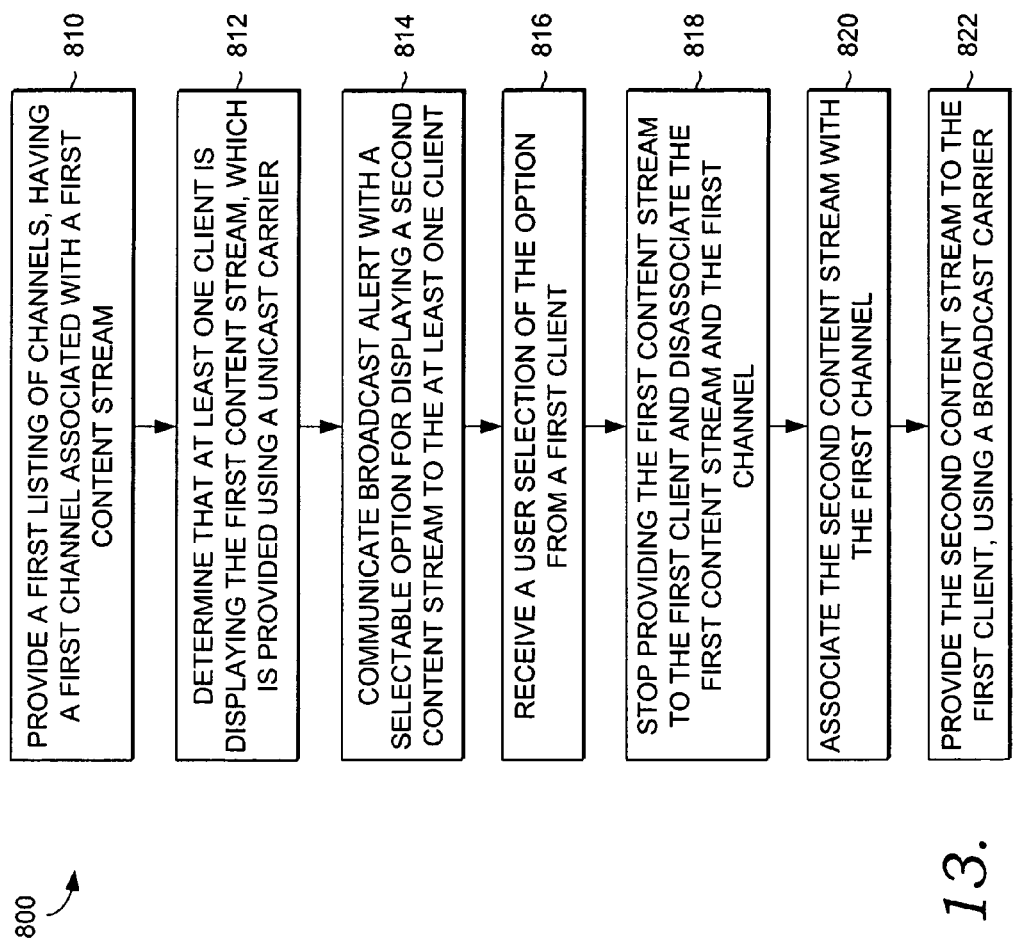

FIG. 13 is a flow diagram showing another illustrative method 800 of dynamically switching between unicast and broadcast delivery of content to a plurality of mobile communications device clients. At a first illustrative step, step 810, a first listing of channels is provided to the plurality of clients. According to an embodiment of the present invention, the first listing of channels includes a first channel that is associated with a first content stream. At step 812 a determination is made that at least one client is displaying the first content stream, which is provided to the client via a unicast stream.

At step 814, a broadcast alert is communicated to the at least one client. The broadcast alert includes a selectable option for displaying a second content stream. In an embodiment, the broadcast alert is communicated at a predetermined time before the second content stream will become available. As shown at step 816, a user selection of the selectable option is received from a first client and in response, as indicated at step 818, provision of the first content stream is stopped and the first content stream is disassociated with the first channel. At step 820, the second content stream is associated with the first channel.

In an embodiment, the first content stream can then be associated with a second channel and in some embodiments, the broadcast alert can include an indication that the first content stream has been associated with the second channel. Moreover, if it is determined that a user of a second client mobile device did not select the option to display the second content stream, an instruction can be provided to the second client to access the first content stream through the second channel. A second displayable listing (e.g., an updated EPG) of channels, including a representation of the second content stream, can be provided to the plurality of clients and at a final illustrative step 822, the second content stream is provided to the first client using a broadcast carrier.

Figure 14:
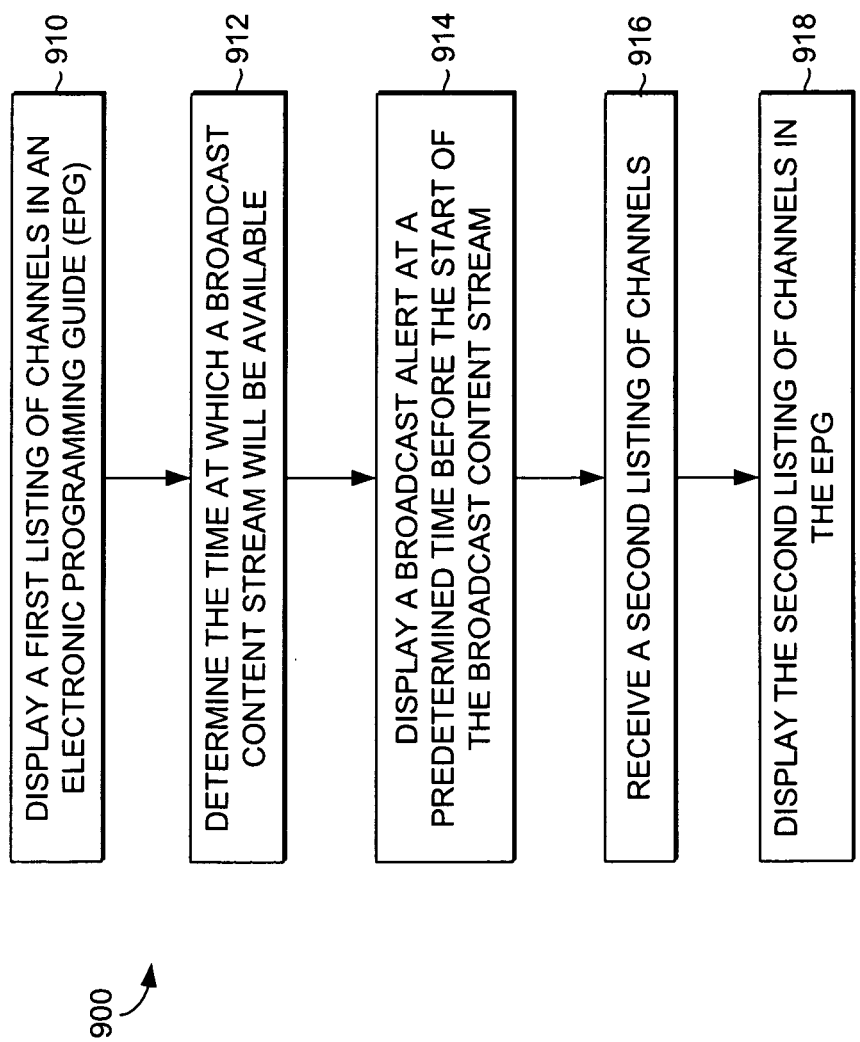

FIG. 14 is a final exemplary flow diagram showing an illustrative method 900 of dynamically switching between unicast and broadcast delivery of content to a mobile communications device client. As shown at a first illustrative step, step 910, a first listing of channels is displayed in an electronic programming guide (EPG). In an embodiment, a first content stream is associated with a first one of the first listing of channels. At step 912, a determination is made regarding the time at which a broadcast content stream will become available. As illustrated at step 914, a broadcast alert is displayed at a predetermined time before the start of the broadcast content stream. At step 916, a second listing of channels is received from the mobile network and at step 918, the second listing of channels is displayed in the EPG. The second listing of channels includes a representation of the broadcast content stream.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-executable instructions embodied thereon for performing a method of dynamically switching between unicast and broadcast delivery of content to a mobile communications device client, the method comprising:
   providing a listing of a plurality of channels;
   providing a first content stream that contains a first selection of content to the client using a unicast carrier transferred by a unicast module in a base station controller (BSC) that facilitates unicast communications over unicast carriers, wherein the first content stream is associated with a first channel;
   communicating a broadcast alert to said client, the broadcast alert comprising an indication that a second content stream that contains a second selection of content, which is different than the first selection of content, is available to the client using a broadcast carrier transferred by a broadcast module in the BSC that facilitates broadcast communications over broadcast carriers;
   receiving a request from the client for the second content stream, wherein the request comprises a user selection of the second content stream;
   stopping provision of the first content stream to the client;
   associating the second content stream with the first channel such that the first content stream is disassociated with the first channel; and
   providing the second content stream to the client using the broadcast carrier.

2. The non-transitory media of claim 1, wherein the first content stream comprises a video clip from a video-on-demand (VOD) service.

3. The non-transitory media of claim 1, wherein the listing of the plurality of channels is displayable as an electronic programming guide (EPG).

4. The non-transitory media of claim 1, wherein the indication comprises a selectable option for displaying the second content stream.

5. The non-transitory media of claim 1, further comprising associating the first content stream with a second channel.

6. One or more non-transitory computer-readable media having computer-executable instructions embodied thereon for performing a method of dynamically switching between unicast and broadcast delivery of content to a mobile communications device client, the method comprising:
   displaying a first listing of channels, wherein a first channel of the first listing of channels is associated with a first content stream that contains a first selection of content that is provided to the client using a unicast carrier transferred by a unicast module in a base station controller (BSC) that facilitates unicast communications over unicast carriers;
   receiving a broadcast alert, said broadcast alert comprising an indication that a second content stream that contains a second selection of content that is provided to the client using a broadcast carrier transferred by a broadcast module in the BSC that facilitates broadcast communications over broadcast carriers, which is different than the first selection of content, will be available; and
   receiving a second listing of channels to replace the first listing of channels, the second listing of channels comprising a representation of the second content stream that associates the second content stream with the first channel such that the first content stream is disassociated with the first channel.

7. The non-transitory media of claim 6, further comprising displaying the first content stream, wherein the broadcast alert comprises a visible alert that indicates that the second content stream will be available on the first channel.

8. The non-transitory media of claim 7, wherein the broadcast alert comprises a selectable option for displaying the second content stream.

9. The non-transitory media of claim 8, further comprising displaying the second content stream in response to a user selection of the option.

10. The non-transitory media of claim 6, further comprising displaying the first content stream, wherein the broadcast alert comprises a visible alert that indicates that the second content stream will be available on a second channel.

11. One or more non-transitory computer-readable media having computer-executable instructions embodied thereon for performing a method of dynamically enabling broadcast delivery of content to a plurality of mobile communications device clients, the method comprising:
   providing a first displayable listing of channels to the plurality of clients, wherein a first channel of the listing of channels is associated with a first content stream that contains a first selection of content;
   determining that at least one of the plurality of clients is displaying the first content stream, wherein the first content stream is provided using a unicast carrier transferred by a unicast module in a base station controller (BSC) that facilitates unicast communications over unicast carriers;
   communicating a broadcast alert to the at least one client, the broadcast alert comprising a selectable option for displaying a second content stream that contains a second selection of content, which is different than the first selection of content;
   receiving a user selection of the selectable option from a first client;
   discontinuing provision of the first content stream to the first client and disassociating the first content stream with the first channel;
   associating the second content stream with the first channel; and
   providing the second content stream to the at least one client using a broadcast carrier transferred by a broadcast module in the BSC that facilitates broadcast communications over broadcast carriers.

12. The non-transitory media of claim 11, further comprising providing a second displayable listing of channels to the plurality of clients, the second listing of channels having a representation of the second content stream.

13. The non-transitory media of claim 11, wherein the broadcast alert is communicated at a predetermined time before the second content stream is available.

14. The non-transitory media of claim 11, further comprising associating the first content stream with a second channel.

15. The non-transitory media of claim 14, further comprising:
   determining that a user selection has not been received from a second client; and
   providing an instruction to the client to access the first content stream through the second channel.

16. The non-transitory media of claim 14, wherein the broadcast alert further comprises an indication that the first content stream is available through the second channel.

\* \* \* \* \*

UNITED STATES PATENT AND TRADEMARK OFFICE
CERTIFICATE OF CORRECTION

PATENT NO. : 8,473,984 B1  
APPLICATION NO. : 12/207176  
DATED : June 25, 2013  
INVENTOR(S) : Jay S. Harmon et al.

It is certified that error appears in the above-identified patent and that said Letters Patent is hereby corrected as shown below:

Title Page, Item (54) and in the Specification, Column 1, line 2, Title, replace the word "BROADCAS" with --BROADCAST--.

Signed and Sealed this  
Nineteenth Day of November, 2013

Teresa Stanek Rea  
*Deputy Director of the United States Patent and Trademark Office*